United States Patent Office 2,853,479
Patented Sept. 23, 1958

2,853,479

METHOD OF PRODUCING CASEIN SUBSTANTIALLY FREE OF VITAMIN $B_{12}$

George Kissel, Bayport, N. Y., assignor, by mesne assignments, to National Dairy Products Corporation, New York, N. Y., a corporation of Delaware No Drawing. Application October 27, 1955
Serial No. 543,269

11 Claims. (Cl. 260—120)

The present invention relates to a process of treating casein, and more particularly to a method of producing casein substantially free of vitamin $B_{12}$.

Persons in the nutrition field requiring a protein source free of vitamin $B_{12}$ have heretofore been compelled to use a vegetable protein plus amino acids. In general, the so called "vitamin-free" caseins on the market at present have sufficient vitamin $B_{12}$ content to cause a growth response in an experimental animal. Accordingly, there is a need for a nutritionally acceptable whole protein which will have a vitamin $B_{12}$ content low enough to give no response with an experimental animal.

In the determination of vitamin $B_{12}$ by microbiological assay of some proteins a pseudo vitamin $B_{12}$ type material gives a growth response which is not apparent in an experimental animal. When this type of protein is treated with alkali before a vitamin $B_{12}$ determination, the microbiological organism L. leichmanii gives substantially the same result as the much more tedious animal feeding experiments. When crude casein is subjected to the same type of alkali treatment, there is no reduction in vitamin $B_{12}$ content by L. leichmanii determination. Therefore, it can be assumed that the vitamin $B_{12}$ found in casein is the clinically active form.

Autoclaving vitamin $B_{12}$ with 0.05 N sodium hydroxide and at 15 p. s. i. pressure for 30 minutes completely destroys the L. leichmanii factor. Autoclaving vitamin $B_{12}$ at pH 10 for 1.5 hours results in a loss of 65% of the vitamin $B_{12}$ activity. Both of these treatments, however, lead to undesirable alterations in casein during the destruction of vitamin $B_{12}$.

Accordingly, it is the object of the present invention to provide a process for producing casein substantially free of vitamin $B_{12}$ wherein the vitamin $B_{12}$ activity is decreased to an acceptable level, i. e., low enough to give no response with an experimental animal, but without destroying the nutritional value of the casein.

The process of the invention is applicable to caseins in general, such as crude casein, purified casein, and so called "vitamin-free" casein. Such caseins have a vitamin $B_{12}$ content ranging from about 0.016 to about 0.032 microgram of vitamin $B_{12}$ per gram of casein. By the process of the invention this vitamin $B_{12}$ content is reduced to such a level that the casein is substantially free of vitamin $B_{12}$, i. e., a residual vitamin $B_{12}$ content of from about 0.00025 to about 0.003 microgram of vitamin $B_{12}$ per gram of casein, these values being below the growth response level of experimental animals.

In general, the process of the invention comprises preparing casein solutions of the proper concentration and at a specified pH and then raising the temperature thereof to a value sufficient to liberate the vitamin $B_{12}$, either with or without a holding period at this temperature. Optimum vitamin $B_{12}$ removal is then obtained by acid precipitation of the casin at this elevated temperature. However, under certain conditions excellent results may be obtained from solutions cooled by dilution to lower temperatures prior to the addition of an acid. The resulting casein precipitate substantially free of vitamin $B_{12}$ may then be washed and dried by conventional procedures. If the casein starting material was a so called "vitamin-free" casein, the product is ready for use. If the casein starting material was crude casein, then further treatment is necessary to remove the other vitamins present in casein when their removal is desirable.

The process of removing vitamin $B_{12}$ activity depends primarily on two factors, the first of which is the extraction of vitamins. This extraction only reaches an optimum when the casein solution is heated above 90° C. Furthermore, the greatest extraction is achieved at low protein concentrations. The second factor is the destruction of the vitamin $B_{12}$. This destruction is not fully understood, but it apparently is more intense at high concentrations. It can be seen, therefore, that a casein solution having a high protein concentration at the time of heating and a low protein concentration at the time of precipitation can lead to optimum removal of vitamin $B_{12}$. For example, in a 2% protein concentration process, 18% of the vitamin $B_{12}$ activity was destroyed and 82% was extractable, whereas in a 10% protein concentration process, 78% of the vitamin $B_{12}$ activity was destroyed and 22% was extractable. Extraction of the vitamin $B_{12}$ is not, however, simply a matter of washing the wet casein curd with either hot or cold water, since repeated washings after precipitation of the casein do not remove significant amounts of vitamin $B_{12}$ activity.

Accordingly, the protein concentration of the aqueous casein solution may be in the range from about 1% to about 10%, and preferably less than about 5%. As noted above, greater extraction of vitamin $B_{12}$ activity is achieved at the lower protein concentrations. However, with suitable treatment it is possible to obtain a satisfactory product from a casein starting material containing as much as 10% protein. At the higher concentrations more delicate control and extensive treatments are necessary.

The pH of the casein solution during heating may lie in the range from about 5 to about 7.4. In order to achieve maximum removal of vitamin $B_{12}$, however, the pH of the casein solution during heating should lie in the range from about 6.2 to about 6.5. Accordingly, this latter pH range is the preferred range. Agents for solubilizing casein as a caseinate and adjusting the pH of the casein solution within these pH ranges include, for example, sodium, potassium, or ammonium hydroxides. It will be appreciated that the phosphate salts of these metals may also be employed.

The casein solution having the above specified protein concentration and pH is heated to a temperature in the range from about 90° C. to about 100° C., and preferably in the range from about 90° C. to about 92° C., to liberate the vitamin $B_{12}$. As a preferred step of the process, the casein solution is held at this temperature for a time up to about three hours. It was found that too high a concentration, pH, or heating period was not conducive to the production of an acceptable casein product.

The casein may be separated from most of the vitamin $B_{12}$ in solution by precipitating the casein at a temperature in the range from about 90° C. to about 100° C. by the addition of an acid. It was found that the maximum removal of vitamin $B_{12}$ activity occurs when the casein is precipitated from a solution of less than about 5% concentration at a temperature higher than about 90° C. When the casein is precipitated from a solution held at such a temperature it is important to adjust the pH of the solution to within the range of 4.49 to 4.51 by the addition of acid. Alternatively, the casein solution having a temperature in the range from about 90° C. to about 100° C. may be diluted with cold water to lower the temperature thereof to a value in the range from about 38° C. to about 52° C. and to reduce the protein concentration thereof to a value in the range from about 2% to about 2.5%. The acid is then added to the cooled dilute casein solution to adjust the pH to a value of about 4.4 to about 4.7 in order to precipitate the casein and separate it from most of the vitamin $B_{12}$ which remains behind in the supernatant. Any organic or inorganic acid which does not destroy casein may be employed in the precipitation of the casein, suitable examples thereof being hydrochloric acid, sulfuric acid, phosphoric acid, lactic acid, and acetic acid.

The process of the invention will be further illustrated in connection with the following two examples, the first of which shows the precipitation of casein at an elevated temperature while the second discloses the precipitation of casein from a cooled dilute casein solution.

EXAMPLE 1

200 grams of purified casein was placed into 4 liters (4000 grams) of hot water having a temperature of 92° C. and sufficient sodium hydroxide added thereto to solubilize the casein as a caseinate at a pH of 6.5. Accordingly, the casein solution had a protein concentration of about 5%. The casein solution was held at this temperature for a period of 10 minutes and hydrochloric acid then rapidly added thereto to lower the pH to 4.5. The casein settled rapidly and the supernatant liquid containing most of the vitamin $B_{12}$ was decanted. The casein precipitate, occupying ⅓ of the original volume, was quickly cooled with 3 liters of cold water. The pH was then readjusted to 4.5 and the casein agitated. The casein curd was collected and washed again with approximately 3 liters of cold water. The casein was then dried in a conventional manner. The high nitrogen casein starting material had a concentration of 0.032 microgram of vitamin $B_{12}$ per gram of casein, while the casein product had a concentration of 0.002 microgram of vitamin $B_{12}$ per gram of casein.

EXAMPLE 2

320 grams of so called "vitamin-free" casein was placed into 3.68 liters (3680 grams) of water and sufficient ammonium hydroxide added thereto to solubilize the casein as a caseinate at a pH of 6.3. Accordingly, the casein solution had a protein concentration of 8%. The solution was then heated to 92° C. and held at this temperature for one hour. The casein solution was then diluted to 2% protein concentration with 12 liters (12000 grams) of cold water, thereby reducing the temperature to 45° C. The casein was then precipitated from the dilute solution by the addition of sufficient acetic acid to impart to the solution a pH of 4.5. The casein was washed with two 4 liter portions of water, care being taken to maintain a pH of 4.5. The casein was dried in a conventional manner. The devitaminized casein starting material had a vitamin $B_{12}$ content of 0.022 microgram per gram of casein, while the vitamin $B_{12}$ content of the casein product was 0.0006 microgram per gram of casein.

Table I

| Example No. | Concentration, percent | Temperature, °C. | pH | Micrograms of Vitamin $B_{12}$ per gram of casein product |
| --- | --- | --- | --- | --- |
| 3 | 5 | 92 | 5.8 | 0.0024 |
| 4 | 5 | 90 | 6.4 | 0.0032 |
| 5 | 5 | 90 | 6.5 | 0.0034 |
| 6 | 5 | 92 | 7.0 | 0.0034 |

Further examples illustrating the process of the invention and showing the influence of a change in temperature and pH of the casein solution at a constant protein concentration are set forth below in Table I. These examples were conducted in accordance with the procedure set forth above in Example 1. The pertinent data pertaining to these examples are set forth in the table.

A determination that the casein products substantially free of vitamin $B_{12}$ in the above examples were not significantly altered physically or physiologically was made by the following tests. Electrophoretic analysis of the treated casein gave the same proportions of constituents having the same mobilities as crude casein, thereby indicating that the physical structure was not altered. Furthermore, animal feeding tests in which supplemental vitamins were furnished, including vitamin $B_{12}$, gave a growth response with the casein products of the examples equivalent to untreated casein, indicating that the nutritional properties were not altered.

The casein product of Example 1 may be further treated, if desired, by conventional methods, such as that set forth in United States Patent No. 2,477,505, issued July 26, 1949, to Weisberg et al., to remove the other vitamins and to obtain a vitamin free casein product. In addition to being used as a nutritionally acceptable whole protein, the casein product may be treated by enzymatic hydrolysis in accordance with the method set forth in Industrial and Engineering Chemistry, volume 44, No. 6, pages 1265, 1266 (June 1952) to produce a vitamin $B_{12}$ free casein hydrolyzate.

It will be apparent to those skilled in the art that various modifications and changes may be made in the process of the invention, and accordingly the process of the invention is to be limited only within the scope of the appended claims.

I claim:

1. The process of producing casein substantially free of vitamin $B_{12}$ comprising heating a casein solution selected from the group consisting of sodium, potassium and ammonium caseinate having a protein concentration of from about 1% to about 10% and a pH of from about 5 to about 7.4 to a temperature from about 90° C. to about 100° C., and adding acid to the casein solution to adjust the pH to a value from about 4.49 to about 4.51.

2. The process as set forth in claim 1 wherein the protein concentration is less than about 5%.

3. The process as set forth in claim 1 wherein the pH of the casein solution during heating is from about 6.2 to about 6.5.

4. The process as set forth in claim 1 wherein the acid is added to the casein solution while the casein solution is at a temperature in the range from about 90° C. to about 100° C.

5. The process as set forth in claim 1 wherein the acid is added to the casein solution while the casein solution is at a temperature in the range from about 90° C. to about 92° C.

6. The process of producing casein substantially free of vitamin $B_{12}$ comprising heating a casein solution selected from the group consisting of sodium, potassium and ammonium caseinate having a protein concentration of from about 1% to about 10% and a pH of from about 5 to about 7.4 to a temperature from about 90° C. to about 100° C., holding the casein solution at said temperature for a time up to about 3 hours, and adding acid thereto at said temperature to adjust the pH to a value from about 4.49 to about 4.51.

7. The process as set forth in claim 6 wherein the protein concentration is less than about 5%.

8. The process as set forth in claim 6 wherein the pH of the casein solution during heating is in the range from about 6.2 to about 6.5.

9. The process of producing casein substantially free of vitamin $B_{12}$ comprising heating a casein solution selected from the group consisting of sodium, potassium and ammonium caseinate having a protein concentration of from about 3% to about 10% and a pH of from about 5 to about 7.4 to a temperature from about 90° C. to about 100° C., adding cold water thereto in an amount sufficient to lower the protein concentration to a range from about 2% to about 2.5% and to lower the temperature to a value from about 38° C. to about 52° C., and adding acid thereto to adjust the pH to a value from about 4.4 to about 4.7.

10. The process as set forth in claim 9 wherein the pH of the casein solution during heating is in the range from about 6.2 to about 6.5.

11. The process as set forth in claim 9 wherein the casein solution is held at the temperature from about 90° C. to about 100° C. for a time up to about 3 hours prior to dilution.

References Cited in the file of this patent

UNITED STATES PATENTS

| | | |
|---|---|---|
| 2,006,700 | Supplee | July 2, 1935 |
| 2,356,795 | Poarch | Aug. 29, 1944 |
| 2,623,038 | Scott | Dec. 23, 1952 |
| 2,665,989 | Howard et al. | Jan. 12, 1954 |

FOREIGN PATENTS

| | | |
|---|---|---|
| 4,207 | Great Britain | of 1901 |
| 704,209 | Great Britain | Feb. 17, 1954 |